(12) United States Patent
Lee et al.

(10) Patent No.: US 10,290,903 B2
(45) Date of Patent: May 14, 2019

(54) JELLYROLL-TYPE ELECTRODE ASSEMBLY AND SECONDARY BATTERY COMPRISING THE SAME

(71) Applicant: LG Chem, Ltd., Seoul (KR)

(72) Inventors: Je-Jun Lee, Daejeon (KR); Pil-Kyu Park, Daejeon (KR); Jeong-In Yu, Daejeon (KR); Cha-Hun Ku, Daejeon (KR)

(73) Assignee: LG Chem, Ltd. (KR)

( * ) Notice: Subject to any disclaimer, the term of this patent is extended or adjusted under 35 U.S.C. 154(b) by 110 days.

(21) Appl. No.: 14/899,029

(22) PCT Filed: Nov. 12, 2014

(86) PCT No.: PCT/KR2014/010874
§ 371 (c)(1),
(2) Date: Dec. 16, 2015

(87) PCT Pub. No.: WO2015/072753
PCT Pub. Date: May 21, 2015

(65) Prior Publication Data
US 2016/0126598 A1 May 5, 2016

(30) Foreign Application Priority Data

Nov. 12, 2013 (KR) .................. 10-2013-0137083
Nov. 12, 2014 (KR) .................. 10-2014-0157429

(51) Int. Cl.
*H01M 10/052* (2010.01)
*H01M 10/0587* (2010.01)
(Continued)

(52) U.S. Cl.
CPC ..... *H01M 10/0587* (2013.01); *H01M 2/0202* (2013.01); *H01M 2/0237* (2013.01);
(Continued)

(58) Field of Classification Search
None
See application file for complete search history.

(56) References Cited

U.S. PATENT DOCUMENTS

2008/0152997 A1   6/2008   Lee
2008/0233474 A1   9/2008   Son et al.
(Continued)

FOREIGN PATENT DOCUMENTS

KR   10-2004-0043039 A   5/2004
KR   10-2007-0097152 A   10/2007
(Continued)

OTHER PUBLICATIONS

International Search Report for Application No. PCT/KR2014/010874 dated Mar. 13, 2015.
Extended Search Report from European Application No. 14862661.7, dated Nov. 4, 2016.
(Continued)

*Primary Examiner* — Sarah A. Slifka
*Assistant Examiner* — Haroon S. Sheikh
(74) *Attorney, Agent, or Firm* — Lerner, David, Littenberg, Krumholz & Mentlik, LLP (57) ABSTRACT

Disclosed is a jellyroll-type electrode assembly including a first electrode, a second electrode, and a separator interposed between the electrodes folded together, in which the first electrode has a non-coating part and a first electrode tab attached onto the non-coating part, the non-coating part representing a part of the first electrode not coated with an active material, and the at least double-folded-layer separator is disposed between the first electrode tab and the second electrode.

18 Claims, 5 Drawing Sheets

(51) Int. Cl.
   *H01M 10/42* (2006.01)
   *H01M 2/26* (2006.01)
   *H01M 4/13* (2010.01)
   *H01M 10/0525* (2010.01)
   *H01M 2/16* (2006.01)
   *H01M 2/02* (2006.01)
   *H01M 2/18* (2006.01)

(52) U.S. Cl.
   CPC ....... *H01M 2/1653* (2013.01); *H01M 2/1686* (2013.01); *H01M 2/18* (2013.01); *H01M 2/263* (2013.01); *H01M 4/13* (2013.01); *H01M 10/052* (2013.01); *H01M 10/0525* (2013.01); *H01M 10/425* (2013.01); *H01M 2200/106* (2013.01); *H01M 2220/20* (2013.01); *H01M 2220/30* (2013.01); *Y02T 10/7011* (2013.01)

(56) References Cited

U.S. PATENT DOCUMENTS

| 2011/0183170 | A1 | 7/2011 | Kwak |
| 2011/0287302 | A1* | 11/2011 | Kim .................. H01M 2/022 429/163 |
| 2011/0293977 | A1 | 12/2011 | Kim et al. |

FOREIGN PATENT DOCUMENTS

| KR | 10-2008-0047635 | 5/2008 |
| KR | 10-2010-0071941 | 6/2010 |
| KR | 10-2011-0087559 | 8/2011 |

OTHER PUBLICATIONS

Zhang, Sheng Shui, "A review of the separators of liquid electrolyte Li-ion batteries." Journal of Power Sources, vol. 164, No. 1., Jan. 1, 2007, pp. 351-364, XP055185408.

* cited by examiner

FIG. 1

PRIOR ART

FIG. 2

PRIOR ART

FIG. 5

JELLYROLL-TYPE ELECTRODE ASSEMBLY AND SECONDARY BATTERY COMPRISING THE SAME

CROSS-REFERENCE TO RELATED APPLICATION

This application is a national phase entry under 35 U.S.C. § 371 of International Application No. PCT/KR2014/010874, filed Nov. 12, 2014, which claims priority to Korean Patent Application No. 10-2013-0137083, filed Nov. 12, 2013 and Korean Patent Application No. 10-2014-0157429, filed Nov. 12, 2014, the disclosures of which are incorporated herein by reference.

TECHNICAL FIELD

The present disclosure relates to a jellyroll-type electrode assembly and a secondary battery comprising the same, and more particularly, to a jellyroll-type electrode assembly with improved safety for preventing damage of a separator or a short circuit between two electrodes caused by heat generated from a positive or negative electrode tab during high-rate discharge and a secondary battery comprising the same.

BACKGROUND ART

Recently, there has been growing interest in energy storage technologies. As the application fields of energy storage technologies have been extended to mobile phones, camcorders, laptop computers and even electric cars, efforts have increasingly been made towards the research and development of electrochemical devices. In this aspect, electrochemical devices have attracted the most attention. Among them, the development of rechargeable secondary batteries has been the focus of particular interest. In recent years, extensive research and development has been conducted to design new electrodes and batteries for the purpose of improving capacity density and specific energy of the batteries.

Among currently available secondary batteries, lithium secondary batteries developed in the early 1990's have received a great deal of attention due to their advantages of higher operating voltages and much higher energy densities than traditional batteries using aqueous electrolyte solutions, such as Ni-MH batteries, Ni—Cd batteries, $H_2SO_4$—Pb batteries, and the like.

Generally, a lithium secondary battery is designed such that a stack or fold structure of a unit cell consisting of a positive electrode, a negative electrode, and a separator interposed between the positive electrode and the negative electrode is embedded in a battery case made of a metal can or a laminate sheet into which an electrolyte solution is then injected or poured.

The electrode assembly of positive electrode/separator/negative electrode structure constituting the secondary battery is greatly classified into a jellyroll-type (fold-type) electrode assembly and a stack-type electrode assembly based on its structure. The fold-type electrode assembly (jellyroll) is manufactured by folding long sheet-type positive and negative electrodes coated with active materials with a separator interposed between the positive electrode and the negative electrode, and the stack-type electrode assembly is manufactured by stacking a plurality of positive electrodes and negative electrodes with a predetermined size in a sequential order with separators interposed between the positive electrodes and the negative electrodes. The jellyroll-type electrode assembly has advantages of being easy to manufacture and high energy density per weight.

A secondary battery with the jellyroll-type electrode assembly experiences damage of the separator resulting from not only contraction of the separator by heat generated from an electrode tab, particularly, a negative electrode tab, during high-rate discharge, but also adhesion of the electrode active material and the separator in semi-melting state. As a result, there is high likelihood that a short circuit will occur due to a contact between the negative electrode and the positive electrode in the jellyroll-type electrode assembly.

Accordingly, to solve the problem, there is still a need for development for a jellyroll-type electrode assembly with improved stability for preventing a short circuit between a positive electrode and a negative electrode caused by heat generated from an electrode tab and a secondary battery comprising the same.

DISCLOSURE

Technical Problem

The present disclosure is directed to providing a jellyroll-type electrode assembly with improved stability and a secondary battery comprising the same.

Technical Solution

To achieve the above object, according to one aspect of the present disclosure, there is provided a jellyroll-type electrode assembly including a first electrode, a second electrode, and a separator interposed between the electrodes folded together, in which the first electrode has a non-coating part and a first electrode tab attached onto the non-coating part, the non-coating part representing a part of the first electrode not coated with an active material, and the at least double-folded-layer separator is disposed between the first electrode tab and the second electrode.

The first electrode tab may be disposed on at least one of both end parts of the first electrode and an intermediate part of the first electrode.

The first electrode may be a negative electrode and the second electrode may be a positive electrode, or the first electrode may be a positive electrode and the second electrode may be a negative electrode.

The jellyroll-type electrode assembly may be folded with separator/first electrode tab/first electrode/separator/separator/first electrode/separator/second electrode put in a sequential order from a center part.

The separator may include a porous polymer substrate, or may include a porous polymer substrate, and a porous coating layer formed on at least one surface of the porous polymer substrate, the porous coating layer containing at least one type of particles of inorganic particles and organic particles and a binder polymer.

The porous polymer substrate may be a porous polymer film substrate or a porous polymer non-woven substrate.

The porous polymer film substrate may be a polyolefin-based porous polymer film substrate.

The polyolefin-based porous polymer film substrate may be formed from polyethylene; polypropylene; polybutylene; polypentene; polyhexene; polyoctene; copolymers of at least two of ethylene, propylene, butene, pentene, 4-methylpentene, hexene and octane; or mixtures thereof.

The polyolefin-based porous substrate may be formed from any one polymer selected from the group consisting of polyethylene, polypropylene, polybutylene, and polypentene.

To achieve the object, according to another aspect of the present disclosure, there is provided a secondary battery including the jellyroll-type electrode assembly and a case to receive the jellyroll-type electrode assembly.

The case may be in a cylindrical, prismatic, or pouch shape.

The secondary battery may be a cylindrical secondary battery further comprising a case made of a cylindrical can, a cap assembly coupled to a top opening of the cylindrical can to seal the can, and a gasket interposed between the can and the cap assembly.

The cap assembly may include a top cap defining a positive electrode terminal, and a safety bent disposed below the top cap with a portion of the other surface coming into contact with the gasket, and electrically connected to the electrode assembly.

The cap assembly may further include a positive temperature coefficient (PTC) device disposed between the top cap and the safety bent.

Advantageous Effects

According to an exemplary embodiment of the present disclosure, there is provided a jellyroll-type electrode assembly with improved safety for preventing damage of a separator or a short circuit between two electrodes caused by heat generated from a positive or negative electrode tab during high-rate discharge and a secondary battery comprising the same.

That is, according to an exemplary embodiment of the present disclosure, at least two-folded-layer separator and a first electrode are disposed between a first electrode tab and a second electrode, to keep heat generated from the first electrode tab from being transmitted to a separator in contact with the first electrode tab and prevent a direct contact between the first electrode and the second electrode caused by damage of all the at least two-folded-layer separator.

Also, the jellyroll-type electrode assembly according to an exemplary embodiment of the present disclosure may impede the contact between the first electrode and the second electrode in the presence of the at least two-folded-layer separator and the first electrode surrounding the first electrode tab even if the separator around the first electrode tab breaks due to a mechanical damage resulting from an external force such as impacts or compression.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR CARRYING OUT THE INVENTION

Hereinafter, the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Also, the description proposed herein is just a preferable example for the purpose of illustrations only, not intended to limit the scope of the disclosure, so it should be understood that other equivalents and modifications could be made thereto without departing from the spirit and scope of the disclosure.

Generally, a jellyroll-type electrode assembly used in, for example, a cylindrical battery according to a related art is manufactured by stacking and folding a positive electrode, a negative electrode, and a separator. Such an electrode assembly is illustrated in FIG. 1.

Figure 1:
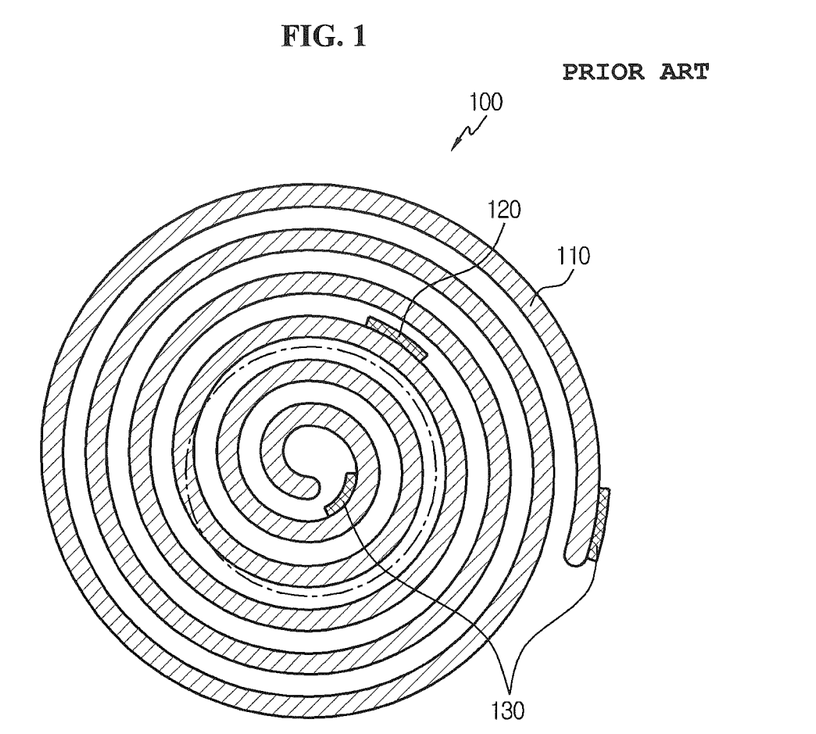
FIG. 1 is a cross-sectional view of a jellyroll-type electrode assembly.

Referring to FIG. 1, a jellyroll-type electrode assembly 100 manufactured by folding has a folded stack structure 110 of a first electrode, a second electrode, and a separator interposed between the electrodes, and the folded jellyroll-type electrode assembly has a first electrode tab 130 attached to one or more non-coating parts (not shown) of the first electrode, i.e., a part not coated with a first electrode active material, and a second electrode tab 120 attached to one or more non-coating parts (not shown) of the second electrode.

Recently, with the applications of secondary batteries in hybrid vehicle (HV), electric vehicle (EV) or energy storage, there is a need for use of secondary batteries in large capacity environment, and accordingly, secondary batteries continue to increase in size and capacity.

The charge and discharge continues to occur repeatedly by electrochemical reactions in secondary batteries, and thus, in the case of large-capacity secondary batteries, heat generation during charge and discharge drastically increases.

Figure 2:
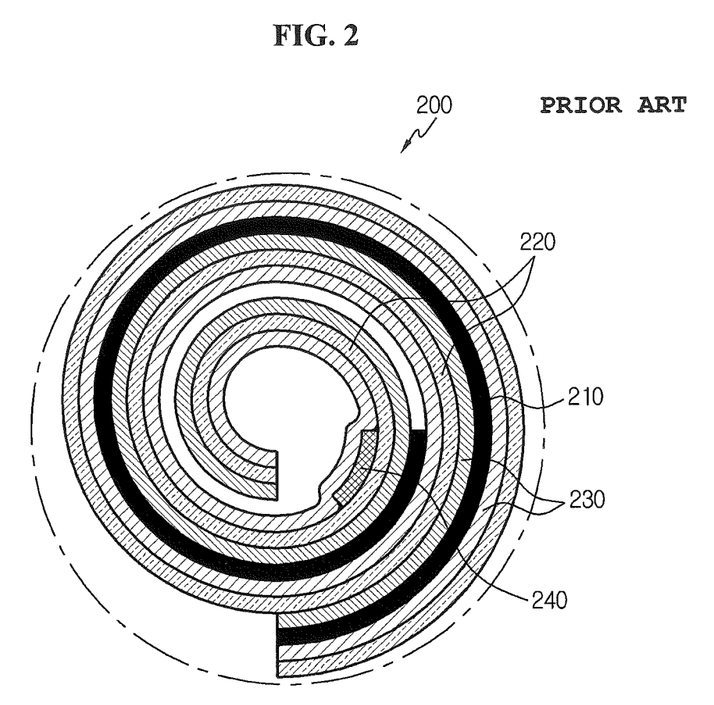
FIG. 2 is a detailed diagram of a center part of a jellyroll-type electrode assembly according to a related art.

Specifically, referring to FIG. 2 illustrating a jellyroll-type electrode assembly 200 according to a related art, heat is generated from a first electrode tab 240 during high-rate discharge, and by the heat generation phenomenon, a separator 230 adjacent to the first electrode tab contracts and is damaged, and as a result, a short circuit occurs in the jellyroll-type electrode assembly 200 due to a contact between a first electrode 220 and a second electrode 210.

To solve the problem, according to one aspect of the present disclosure, there is provided a jellyroll-type electrode assembly including a first electrode, a second electrode, and a separator interposed between the electrodes folded together, in which the first electrode has a part not coated with an active material (hereinafter referred to as a non-coating part) and a first electrode tab attached onto the non-coating part, and the at least two-folded-layer separator is disposed between the first electrode tab and the second electrode.

Figure 3:
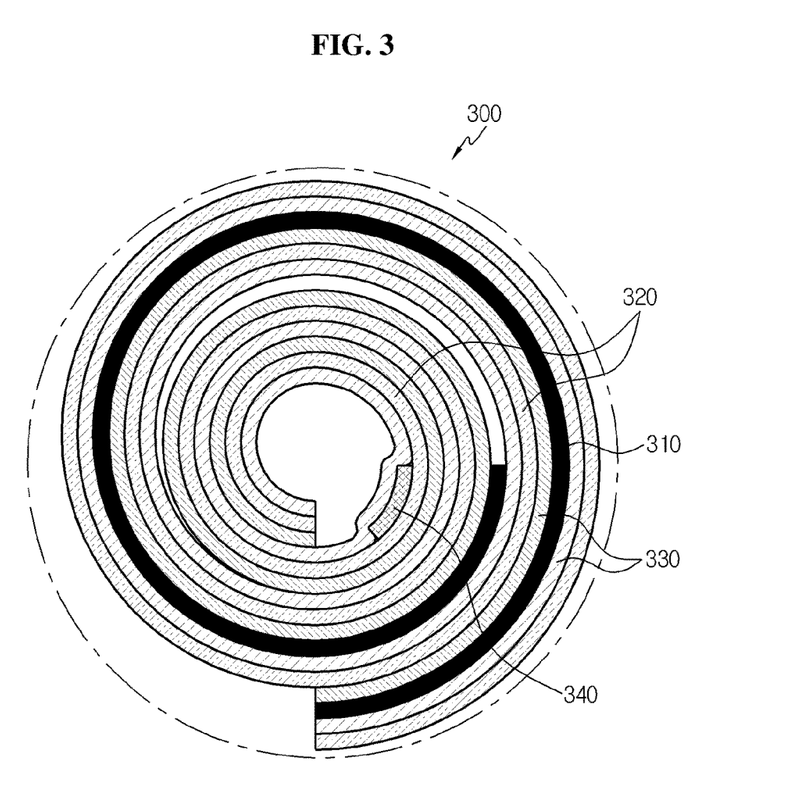
FIG. 3 is a detailed diagram of a center part of a jellyroll-type electrode assembly according to an exemplary embodiment of the present disclosure.

Referring to FIG. 3, a jellyroll-type electrode assembly according to an exemplary embodiment of the present disclosure is illustrated. That is, the jellyroll-type electrode assembly 300 includes a first electrode 320, a second electrode 310, and a separator 330 interposed between the electrodes folded together, in which a first electrode tab 340 formed on a first electrode non-coating part (not shown) is provided at the center part of the folded jellyroll-type electrode assembly, and the at least two-folded-layer separator is disposed between the first electrode tab 340 and the second electrode 310.

In contrast, the jellyroll-type electrode assembly according to the related art as shown in FIG. 2 is folded with first electrode tab/first electrode/separator/second electrode put in a sequential order, and when the first electrode tab generates heat, a mere single-layer separator is interposed between the first electrode having the first electrode tab attached thereto and the second electrode. As a result, when the heat generated from the first electrode tab is transmitted, the single-layer separator contracts by the heat, and when the heat is continuously transmitted or the heat reaches a high temperature, the separator is damaged in the end and it fails to perform a function of preventing a direct contact between the first electrode and the second electrode, causing a short circuit phenomenon of the first electrode and the second electrode.

However, the jellyroll-type electrode assembly according to an exemplary embodiment of the present disclosure as shown in FIG. 3 is folded with first electrode tab/first electrode/separator/separator/first electrode/separator/second electrode put in a sequential order from the center part thereof. As the at least two-folded-layer separator and the first electrode are disposed between the first electrode tab and the second electrode, the jellyroll-type electrode assembly is characterized by having a structure of effectively blocking heat generated from the first electrode tab by virtue of the at least two-folded-layer separator and the first electrode, significantly reducing the likelihood of damage of all the at least two-folded-layer separator, and thus fundamentally preventing a direct contact between the first electrode and the second electrode.

Also, the jellyroll-type electrode assembly according to an exemplary embodiment of the present disclosure may impede the contact between the first electrode and the second electrode in the presence of the at least two-folded-layer separator and the first electrode surrounding the first electrode tab, when the separator around the first electrode tab breaks due to a mechanical damage of a secondary battery with the jellyroll-type electrode assembly resulting from an external force as impacts or compression.

The first electrode tab may be attached onto a non-coating part, i.e., a part of the first electrode not coated with an electrode active material, and the first electrode may have at least one non-coating part. For example, the non-coating part may be disposed on at least one of both end parts of the first electrode and an arbitrary intermediate part between the both end parts. As a result, at least one first electrode tab corresponding to the number of the non-coating parts may be present.

That is, the jellyroll-type electrode assembly according to an exemplary embodiment of the present disclosure may have the first electrode tab disposed at the center part of the electrode assembly as shown in FIG. 3, as well as an outside part of the folded electrode assembly or an arbitrary middle part between the center part and the outside part, and in this case, the at least two-folded-layer separator may be disposed between the first electrode tab and the second electrode closest to the first electrode tab.

In this instance, the separator may include a porous polymer substrate, or may include a porous polymer substrate and a porous coating layer formed on at least one surface of the porous polymer substrate, the porous coating layer containing at least one type of particles of inorganic particles and organic particles and a binder polymer.

The porous polymer substrate may employ a porous polymer film substrate or a porous polymer non-woven substrate. As the porous polymer film substrate, a polyolefin-based porous polymer film substrate may be used, and the polyolefin porous film substrate is not limited to a particular type if it is commonly used in the art, and may include, but is not limited to, for example, polyethylene such as high density polyethylene (HDPE), low density polyethylene (LDPE), linear low density polyethylene (LLDPE), and ultra high molecular weight polyethylene (UHMWPE); polypropylene; polybutylene; polypentene; polyhexene; polyoctene; copolymers of at least two of ethylene, propylene, butene, pentene, 4-methylpentene, hexene and octane; or mixtures thereof. The polyolefin porous polymer film substrate exhibits a shut-down function at the temperature, for example, from 80° C. to 130° C.

Also, the porous polymer film substrate may be manufactured using various polymers including polyester, as well as polyolefin. Also, the porous polymer film substrate may be formed in a stack structure of at least two film layers, and each film layer may be formed from polymer, for example, polyolefin and polyester as described above, singularly or in combination.

The porous polymer non-woven substrate may be manufactured from fibers using polymer including polyolefin-based polymer as described above or other polymer with higher heat resistance, for example, polyester such as polyethyleneterephthalate (PET). The porous polymer non-woven substrate may be manufactured from the fibers, singularly or in combination.

The material or shape of the porous polymer film substrate may be variously selected based on the desired purpose.

There is no particular limitation on the thickness of the porous polymer substrate, but a preferred thickness is in the range of 1 µm to 100 µm, more preferably, 5 µm to 50 µm, and there is no particular limitation on the pore size and porosity of the porous polymer substrate, but the pore size and porosity is preferably from 0.01 µm to 50 µm and from 10% to 95%, respectively.

Also, the separator may further include a porous coating layer formed on at least one surface of the porous polymer substrate.

The porous coating layer contains at least one type of particles of inorganic particles and organic particles and a binder polymer, and specifically, when the particles are packed and come into contact with each other, and in this state, the particles are bound with each other by the binder polymer, interstitial volumes are thereby formed between the particles and the interstitial volumes between the particles become a void space to form pores.

That is, the binder polymer allows the particles to be adhered to each other to maintain the bound state of the particles, and for example, the binder polymer connects and holds the particles. Also, the pores of the porous coating layer are pores formed with the interstitial volumes between the particles that define voids, and this is a space defined by the particles substantially in surface contact in a closed packed or densely packed structure of the particles. This pore structure is filled with an electrolyte solution to be injected later, and the filled electrolyte solution may provide a channel for movement of lithium ions essential to operate a battery through the pores of the porous coating layer.

The thickness of the porous coating layer is not particularly limited, but may be in the range of 0.01 μm to 20 μm, and the pore size and the porosity is not particularly limited, but the pores size may be in the range of 0.001 μm to 10 μm and the porosity may be in the range of 10% to 99%. The pore size and the porosity mainly depends on the size of the particles used, and when particles with a grain diameter, for example, less than or equal to 1 μm are used, the resulting pores show approximately 1 μm or less in size.

The inorganic particles are not particularly limited if they are electrochemically stable. That is, the inorganic particles that may be used in the present disclosure are not particularly limited if they do not cause oxidation and/or reduction reactions in an operating voltage range (for example, from 0 to 5V for $Li/Li^+$) of an electrochemical device being applied. In particular, when inorganic particles capable of transporting ions are used, ionic conductivity in an electrochemical device increases, contributing to performance improvement. Also, when inorganic particles having a high dielectric constant are used as the inorganic particles, such inorganic particles may contribute to the increase in the degree of dissociation of an electrolyte salt, for example, a lithium salt, in a liquid electrolyte and may improve ionic conductivity of an electrolyte solution.

The inorganic particles include, as a non-limiting example, inorganic particles having a high dielectric constant greater than or equal to 5, preferably, greater than or equal to 10, inorganic particles capable of transporting lithium ions, or mixtures thereof.

The inorganic particles having a dielectric constant greater than or equal to 5 include, as a non-limiting example, $BaTiO_3$, $Pb(Zr,Ti)O_3$(PZT), $Pb_{1-x}La_xZr_{1-y}Ti_yO_3$(PLZT), $PB(Mg_3Nb_{2/3})O_3-PbTiO_3$(PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, or mixtures thereof.

In the specification, the 'inorganic particles capable of transporting lithium ions' refer to inorganic particles that contain lithium atoms and have a function of transferring a lithium ion without storing lithium, and the inorganic particles capable of transporting lithium ions include, as a non-limiting example, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ based glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4-Li_2S-SiS_2$, $P_2S_5$ based glass ($Li_xP_yS_z$, $0<x<3$, $0<y<3$, $0<z<7$) such as $LiI-Li_2S-P_2S_5$, or mixtures thereof.

The organic particles are advantageous in aspects of air permeability, thermal shrinking characteristics, and peeling strength, and are excellent in binding with the binder polymer.

The organic particles may include, as a non-limiting example, particles made from various types of polymers such as polystyrene, polyethylene, melamine-based resin, phenol-based resin, cellulose, modified cellulose (carboxymethyl cellulose), polypropylene, polyester (polyethyleneterephthalate, polyethylenenaphthalate, and polybuthyleneterephthalate), polyphenylene sulfide, polyamide, polyamide imide, polyimide, and butylacrylate-ethylmethacrylate copolymers (crosslinked polymers of butylacrylate and ethylmethacrylate). The organic particles may be made from at least two types of polymers.

The size of the inorganic particles or the organic particles is not limited, but may be each in a range of 0.001 μm to 10 μm, independently, to form a coating layer with a uniform thickness and have a proper porosity.

The binder polymer is not limited to a particularly type if it functions to connect the inorganic particles or the organic particles and stably hold them, and may include, as a non-limiting example, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer and polyimide, singularly or in combination.

A composition ratio of the particles and the binder polymer may be, for example, in the range of 50:50 to 99:1, or in the range of 70:30 to 95:5, based on the weight. When the content of the particles to the binder polymer is excessively low, improvements in thermal safety of the separator may be reduced, and due to insufficient formation of interstitial volumes between the particles, the pore size and the porosity are reduced, causing a reduction in final battery performance. In contrast, when the content of the particles to the binder polymer is excessively high, the peeling resistance of the porous coating layer may be reduced.

The porous coating layer may be formed by coating a slurry on at least one surface of the porous polymer substrate, the slurry including not only the particles and the binder as described above but also a solvent to uniformly disperse them, followed by drying. In this instance, non-limiting examples of available solvents may include acetone, tetrahydrofuran, methylene chloride, chloroform, dimethylformamide, N-methyl-2-pyrrolidone (NMP), cyclohexane, water, or mixtures thereof.

The jellyroll-type electrode assembly is manufactured by forming a stack structure of separator/first electrode with first electrode tab/separator put in a sequential order, stacking a second electrode thereon inside far away from one end of the stack structure, and folding them with the at least two-folded-layer separator wrapped around between the first electrode tab and the second electrode as described above.

In this instance, the first electrode may be a negative electrode and the second electrode may be a positive electrode, and the first electrode may be a positive electrode and the second electrode may be a negative electrode. In practice, heat is generated from an electrode tab during high-rate discharge, and particularly, among the internal components of a battery, a negative electrode tab with especially high resistance generates a vast majority of heat. Thus, the heat generation issue of the electrode tab needs to be controlled, especially, more importantly, over the negative electrode tab, but this issue is not necessarily limited to the negative electrode tab, and the heat generation phenomenon still remains problematic in the positive electrode tab.

There is no particular limitation on both electrodes, the positive electrode and the negative electrode, and the electrodes may be manufactured by binding an electrode active material to an electrode current collector by a method commonly known in the art.

Of the electrode active material, a positive electrode active material includes, as a non-limiting example, a general positive electrode active material commonly used in a positive electrode of an electrochemical device, and particularly, it is preferred to use lithium manganese oxide, lithium cobalt oxide, lithium nickel oxide, lithium iron oxide, or lithium composite oxides thereof.

A negative electrode active material includes, as a non-limiting example, a general negative electrode active material commonly used in a negative electrode of an electrochemical device, and particularly, a lithium adsorption material is preferred such as a lithium metal or a lithium alloy, carbon, petroleum coke, activated carbon, graphite, or other carbons. A non-limiting example of a positive electrode current collector includes a foil made from aluminum, nickel, or a combination thereof, and a non-limiting example of a negative electrode current collector includes a foil made from copper, gold, nickel or copper alloy or combinations thereof.

According to one aspect of the present disclosure, there is provided a secondary battery including the jellyroll-type electrode assembly; and a case to receive the jellyroll-type electrode assembly.

The case is not limited to a particular shape, and may have any shape designed to receive the jellyroll-type electrode assembly, and for example, a cylindrical, prismatic, or pouch shape may be used. As a result, the jellyroll-type electrode assembly may be formed to have a circular or oval cross section based on the shape of the case where the jellyroll-type electrode assembly is received.

A cap assembly may include a top cap defining a positive electrode terminal; and a safety bent disposed below the top cap with a portion of the other surface coming into contact with a gasket, the safety bent being electrically connected to the electrode assembly. Also, the cap assembly may further include a positive temperature coefficient (PTC) device disposed between the top cap and the safety bent.

Figure 4:
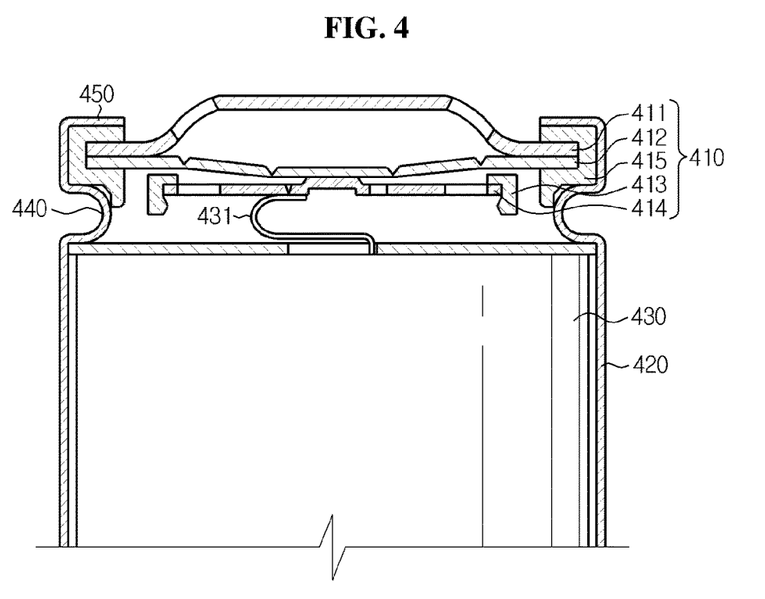
FIGS. 4 and 5 are cross-sectional views of a cylindrical secondary battery with a jellyroll-type electrode assembly according to an exemplary embodiment of the present disclosure.
Figure 5:
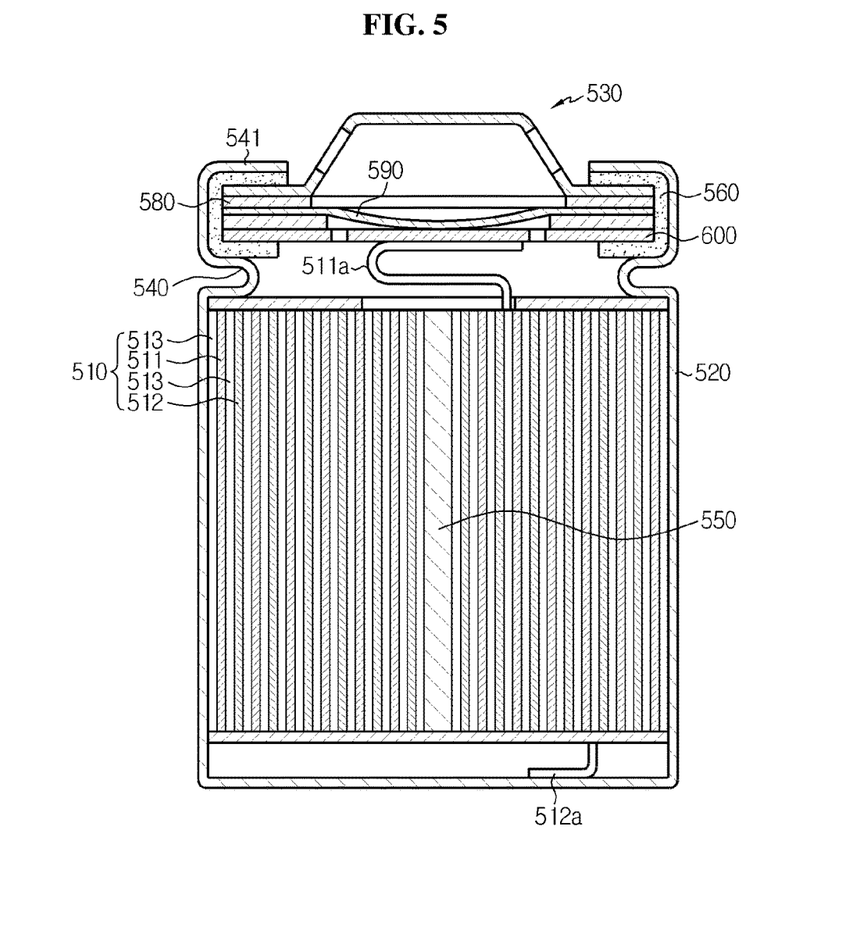

FIGS. 4 and 5 are cross-sectional views of a secondary battery, specifically, a cylindrical secondary battery according to an exemplary embodiment of the present disclosure.

Referring to FIG. 4, the cylindrical secondary battery according to an exemplary embodiment of the present disclosure includes a battery can 420, a jellyroll-type electrode assembly 430 received in the battery can 420, a cap assembly 410 coupled to the top of the battery can 420, a beading part 440 provided at the front end of the battery can 420 to mount the cap assembly 410, and a crimping part 450 for sealing the battery.

The electrode assembly 430 has a structure in which a positive electrode and a negative electrode are folded in jellyroll form with a separator interposed between the positive electrode and the negative electrode, and the positive electrode has a positive electrode lead 431 attached to connect to the cap assembly 410 and the negative electrode has a negative electrode lead (not shown) attached to connect to the bottom of the battery can 420.

The cap assembly 410 has a stack structure of a top cap 411 defining a positive electrode terminal, a safety bent 412 to interrupt an electric current and/or to exhaust gas in the event of the pressure rise in the battery, an insulating member 413 to electrically isolate the safety bent 412 except a particular area from a current interruption device 414, and the current interruption device 414 to which the positive electrode lead 431 connected to the positive electrode is connected, put one on top of another in a sequential order. Also, the cap assembly 410 is fitted with a gasket 415, and in this state, the cap assembly 410 is mounted on the beading part 440 of the battery can 420. Thus, in a normal operating condition, the positive electrode of the electrode assembly 430 is connected to the top cap 411 via the positive electrode lead 431, the current interruption member 414, and the safety bent 412 to allow electrical conduction.

Also, referring to FIG. 5, the cylindrical secondary battery according to an exemplary embodiment of the present disclosure includes a jellyroll-type electrode assembly 510, a battery can 520 to receive the jellyroll-type electrode assembly 510, a cap assembly 530 coupled to the top opening of the battery can 520 to seal the battery can, and a gasket 560 interposed between the battery can and the cap assembly.

Also, a center pin 550 may be inserted into the center of the electrode assembly. The center pin is inserted into a core to allow easier folding when an attempt is made to fold the electrode assembly in jellyroll form, and acts to fix and support the electrode assembly.

The center pin may be made of a steel metal such as steel use stainless (SUS) to impose predetermined rigidity, and with an aim to prevent the transformation of a hollow internal structure when an external impact such as a fall and compression is applied to the battery, the center pin may be made of flexible metal, metal oxide or polymer.

Thus, the center pin may be made of at least one selected from the group consisting of, but is not limited to, stainless steel, copper, tantalum, titanium, aluminum, niobium, zinc, tin, tantalum oxide, titanium oxide, aluminum oxide, niobium oxide, zinc oxide, tin oxide, copper oxide, polyethylene, polypropylene, polyimide, polyamide, polycarbonate, and polymethylmethacrylate.

The center pin may have a hollow structure, and in this case, may serve as a channel for discharging gas generated by an internal reaction during charge/discharge and operation of the secondary battery.

In this instance, to mount the cap assembly 530, a beading part 540 provided at the front end of the battery can 520 and a crimping part 541 for sealing the battery are equipped.

The jellyroll-type electrode assembly 510 has a structure in which a positive electrode 511 and a negative electrode 512 are folded in jellyroll form with a separator 513 interposed between the positive electrode and the negative electrode, and generally, the positive electrode 511 has a positive electrode lead 511a attached to connect to the cap assembly 530, and the negative electrode 512 has a negative electrode lead 512a attached to connect to the bottom of the battery can 520.

Also, the jellyroll-type electrode assembly 510 has a top cap 570 to seal an opening of the battery can and define a positive electrode terminal, a PTC device 580 to interrupt an electric current by virtue of the increased resistance in the event of the temperature rise in the battery and disposed in contact with the top cap, and a safety bent 590 to interrupt an electric current and exhaust gas in the event of the pressure rise in the battery, disposed such that one surface comes into contact with the PTC device and a portion of the other surface comes into contact with the gasket, and electrically connected to the electrode assembly. In addition, the jellyroll-type electrode assembly 510 may further have a current interruption device 600 to which the positive electrode tab 511a is connected. The cap assembly 530 is fastened in the opening on the top of the battery can 520 and is mounted on the beading part 540 of the battery can 520.

Inside the battery can 510, the jellyroll-type electrode assembly 510 and an electrolyte solution (not shown) are received.

The electrolyte solution that may be used in the electrode assembly of the present disclosure may be an electrolyte solution in which a salt is dissolved or dissociated in an organic solvent, the salt having a structure represented by, for example, $A^+B^-$ wherein $A^+$ is an alkali metal cation such as $Li^+$, $Na^+$, $K^+$, or combinations thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, and the organic solvent including, but is not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof. The pouring of the electrolyte solution may be performed in any suitable step of a battery manufacturing process based on a manufacturing process and required physical properties of a final product. That is, the pouring of the electrolyte solution may be applied before battery assembling or in the final step of battery assembling.

DETAILED DESCRIPTION OF REFERENCE NUMERALS 100, 200, 300, 430, 510: Jellyroll-type electrode assembly
110: Stack structure of first electrode, second electrode, and separator interposed between electrodes
120: Second electrode tab
130, 240, 340: First electrode tab
210, 310: Second electrode
220, 320: First electrode
230, 330: Separator
20, 520: Battery can
410, 530: Cap assembly
411: Top cap
412, 590: Safety bent
414, 600: Current interruption device
413: Insulating member
414: Current interruption member
415, 560: Gasket
431: Positive electrode lead
440, 540: Beading part
450, 541: Crimping part
511: Positive electrode
511a: Positive electrode tab
512: Negative electrode
512a: Negative electrode tab
550: Center pin
570: Top cap
580: PTC device

What is claimed is:

1. A jellyroll-type electrode assembly comprising a first electrode, a second electrode, and a first separator and a second separator interposed between the electrodes,
wherein the first electrode has a non-coating part and a first electrode tab attached onto the non-coating part, the non-coating part representing a part of the first electrode not coated with an active material, the first electrode tab being disposed at the center portion of the jellyroll-type electrode assembly, and the first and second separators are configured so that they extend continuously from the center portion of the jellyroll-type electrode assembly in the form of a spiral extending outwardly so as to be disposed between the first electrode tab and the second electrode,
wherein the jellyroll-type electrode assembly is folded with the first separator/the first electrode tab/first electrode/second separator/first separator/second separator/second electrode put in a sequential order at the center portion and wherein the jellyroll-type electrode assembly has a circular cross section.

2. The jellyroll-type electrode assembly according to claim 1, wherein the first electrode is a negative electrode and the second electrode is a positive electrode.

3. The jellyroll-type electrode assembly according to claim 1, wherein the first electrode is a positive electrode and the second electrode is a negative electrode.

4. The jellyroll-type electrode assembly according to claim 1, wherein the separator includes a porous polymer substrate, or includes a porous polymer substrate and a porous coating layer formed on at least one surface of the porous polymer substrate, the porous coating layer containing at least one type of particles of inorganic particles and organic particles and a binder polymer.

5. The jellyroll-type electrode assembly according to claim 4, wherein the porous polymer substrate is a porous polymer film substrate or a porous polymer non-woven substrate.

6. The jellyroll-type electrode assembly according to claim 5, wherein the porous polymer film substrate is a polyolefin-based porous polymer film substrate.

7. The jellyroll-type electrode assembly according to claim 6, wherein the polyolefin-based porous polymer film substrate is formed from polyethylene, polypropylene, polybutylene, polypentene; polyhexene, polyoctene, copolymers of at least two of ethylene, propylene, butene, pentene, 4-methylpentene, hexene and octane, or mixtures thereof.

8. A secondary battery comprising:
a jellyroll-type electrode assembly defined in claim 1; and
a case to receive the jellyroll-type electrode assembly.

9. The secondary battery according to claim 8, wherein the case is in a cylindrical, prismatic, or pouch shape.

10. The secondary battery according to claim 8, wherein the secondary battery is a cylindrical secondary battery further comprising a case made of a cylindrical can, a cap assembly coupled to a top opening of the cylindrical can to seal the can, and a gasket interposed between the can and the cap assembly.

11. The secondary battery according to claim 10, wherein the cap assembly comprises:
a top cap defining a positive electrode terminal; and
a safety bent disposed below the top cap with a portion of another surface coming into contact with the gasket, and electrically connected to the electrode assembly.

12. The secondary battery according to claim 11, wherein the cap assembly further comprises a positive temperature coefficient (PTC) device disposed between the top cap and the safety bent.

13. A jellyroll-type electrode assembly comprising a first electrode, a second electrode, and a first separator and a second separator interposed between the electrodes,
wherein the first electrode has a pair of non-coating parts and a pair of first electrode tabs attached onto the pair of non-coating parts, the non-coating parts representing parts of the first electrode not coated with an active material, one of the pair of first electrode tabs being disposed at the center portion of the jellyroll-type electrode assembly and the other of the pair of first electrode tabs being disposed at an outside portion of the jellyroll-type electrode assembly, and the first and second separators are configured so that they extend continuously from the center portion of the jellyroll-type electrode assembly in the form of a spiral extending outwardly so as to be disposed between one of the pair of first electrode tabs and the second electrode,
wherein the jellyroll-type electrode assembly is folded with the first separator/one of the pair of first electrode tabs/first electrode/second separator/first separator/first electrode/second separator/second electrode put in a sequential order at the center portion.

14. The jellyroll-type electrode assembly according to claim 13, wherein the first electrode is a negative electrode and the second electrode is a positive electrode.

15. The jellyroll-type electrode assembly according to claim 13, wherein the first electrode is a positive electrode and the second electrode is a negative electrode.

16. The jellyroll-type electrode assembly according to claim 13, wherein the separator includes a porous polymer substrate, or includes a porous polymer substrate and a porous coating layer formed on at least one surface of the porous polymer substrate, the porous coating layer containing at least one type of particles of inorganic particles and organic particles and a binder polymer.

17. The jellyroll-type electrode assembly according to claim 16, wherein the porous polymer film substrate is a polyolefin-based porous polymer film substrate.

18. The jellyroll-type electrode assembly according to claim 17, wherein the polyolefin-based porous polymer film substrate is formed from polyethylene, polypropylene, polybutylene, polypentene, polyhexene, polyoctene, copolymers of at least two of ethylene, propylene, butene, pentene, 4-methylpentene, hexene and octane, or mixtures thereof.

* * * * *